(12) United States Patent
Biran et al.

(10) Patent No.: US 12,395,452 B1
(45) Date of Patent: Aug. 19, 2025

(54) SCALING-AWARE TRAFFIC REQUEST PRIORITIZATION FOR SCALABLE CONNECTION-BASED RESOURCE

(71) Applicant: Amazon Technologies, Inc., Seattle, WA (US)

(72) Inventors: Yahav Biran, Redmond, WA (US); Jonathan S. Katz, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/192,586

(22) Filed: Mar. 29, 2023

(51) Int. Cl.
  *H04L 47/70* (2022.01)
  *H04L 47/74* (2022.01)
  *H04L 47/83* (2022.01)

(52) U.S. Cl.
  CPC .......... *H04L 47/828* (2013.01); *H04L 47/748* (2013.01); *H04L 47/83* (2022.05)

(58) Field of Classification Search
  CPC .... H04L 47/828; H04L 47/748; H04L 47/823
  See application file for complete search history.

(56) References Cited

U.S. PATENT DOCUMENTS

| | | | | |
|---|---|---|---|---|
| 7,673,057 | B1 * | 3/2010 | Yip ....................... | H04L 47/822 370/232 |
| 10,021,008 | B1 * | 7/2018 | Pai ........................ | H04L 47/748 |
| 2011/0069685 | A1 * | 3/2011 | Tofighbakhsh ..... | H04L 43/0858 370/235 |
| 2019/0173804 | A1 * | 6/2019 | Nicas .................... | H04L 47/822 |
| 2019/0340033 | A1 * | 11/2019 | Ganteaume ............ | H04L 43/16 |
| 2020/0026579 | A1 * | 1/2020 | Bahramshahry ...... | G06F 9/5077 |
| 2021/0211391 | A1 * | 7/2021 | Paraschiv ............. | G06F 9/3877 |
| 2023/0318988 | A1 * | 10/2023 | Wang ..................... | H04L 47/83 709/226 |

OTHER PUBLICATIONS

AWS, "Amazo Aurora User Guide for Aurora", Retrieved from https://docs.aws.amazon.com/pdfs/AmazonRDS/latest/AuroraUserGuide/aurora-ug.pdf#rds-proxy, Updated on Mar. 22, 2023, pp. 1-2156.

AWS, "Connection management and pooling", Retrieved from https://docs.aws.amazon.com/whitepapers/latest/amazon-aurora-mysql-db-admin-handbook/connection-management-and-pooling.html, 2023, pp. 1-2.

* cited by examiner

*Primary Examiner* — Joe Chacko
(74) *Attorney, Agent, or Firm* — Robert C. Kowert; Kowert, Hood, Munyon, Rankin & Goetzel, P.C.

(57) ABSTRACT

A scaling-aware prioritization manager for a scalable connection-based resource receives request traffic and monitors the traffic. The manager may also monitor a connection capacity to the connection-based resource or request processing capacity of the scalable connection-based resource. The prioritization manager enables priority-based routing of new request traffic, based on a determination that the scalable connection-based resource is at or within a threshold limit of a maximum scale capacity for the scalable connection-based resource and disables the priority-based routing of new request traffic, based on a determination that the scalable connection-based resource is no longer at or within a threshold limit of the maximum scale capacity. The prioritization manager may provide an interface for customers to configure the prioritization. The prioritization manager may include an artificial intelligence component for detecting anomalies and generating or modifying priority policies.

20 Claims, 8 Drawing Sheets

SCALING-AWARE TRAFFIC REQUEST PRIORITIZATION FOR SCALABLE CONNECTION-BASED RESOURCE

BACKGROUND

Availability of connection-based resources (e.g., resources of a computing system such as a compute resource service, database resource service, or other type of storage resource service, or combinations thereof) can be limited. Clients (e.g., network-based applications such as websites, various processes, or the like) that rely on such connection-based resources can be interrupted when the connection-based resource is unable to process all of the requests from the client in a timely fashion. In a database example, a single database writer may be used to host different client application use cases. If the resources of that database server are exhausted, the client application may be interrupted. For example, the connection-based resource (the database server) may drop requests from the client application indiscriminately, or at least not in a manner coinciding with the business logic associated with the client application. Such indiscriminate interruptions hinder client application processes, such as transactional flows that unexpectedly break in the middle due to the indiscriminate drops by the connection-based resource.

Figure 1:
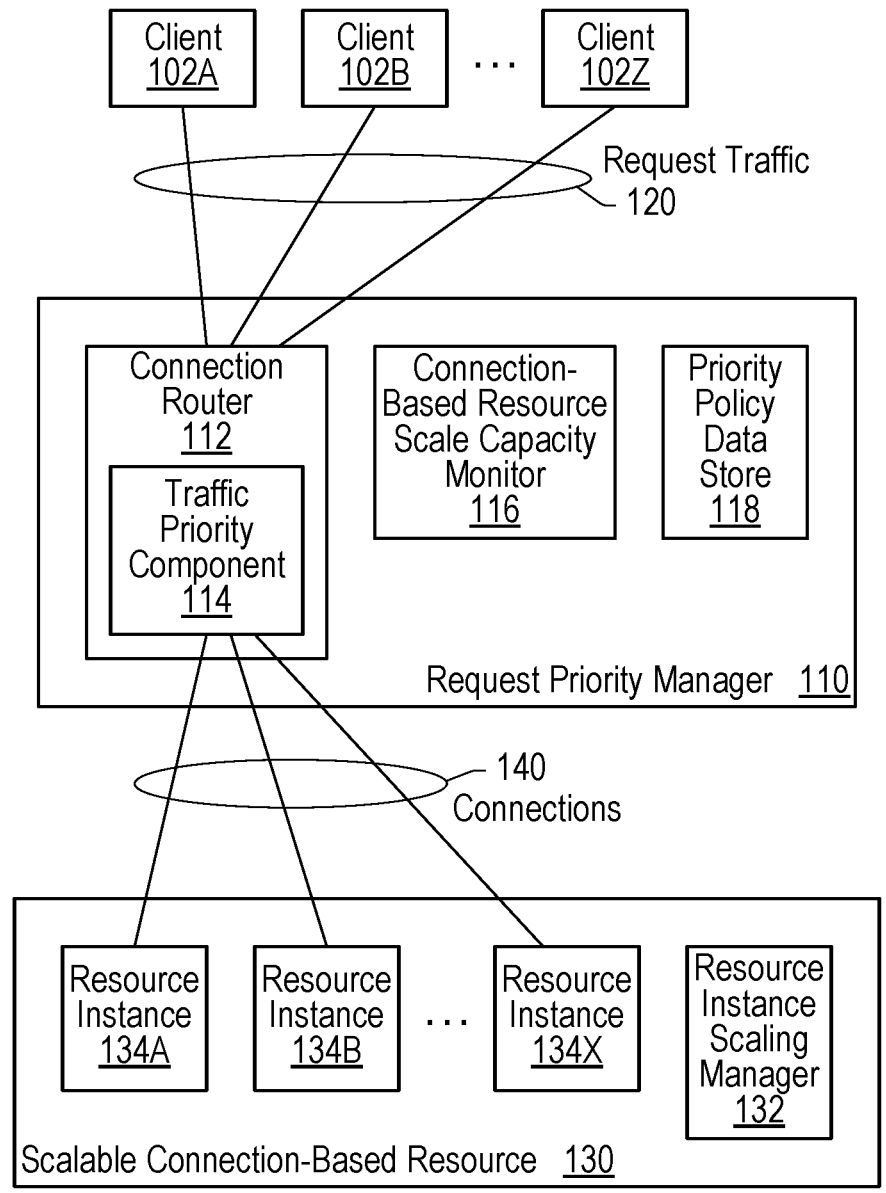
FIG. 1 is a block diagram that illustrates a logical architecture of a system for scaling-aware traffic request prioritization for a scalable connection-based resource, according to some embodiments.

While the solution is described herein by way of example for several embodiments and illustrative drawings, those skilled in the art will recognize that the solution is not limited to the embodiments or drawings described. It should be understood, that the drawings and detailed description thereto are not intended to limit the solution to the particular form disclosed, but on the contrary, the intention is to cover all modifications, equivalents and alternatives falling within the spirit and scope of the present solution. Headings used herein are for organizational purposes only and are not meant to be used to limit the scope of the description.

DETAILED DESCRIPTION OF EMBODIMENTS

As discussed in more detail below, systems and methods for embodiments of scaling-aware traffic request prioritization for a scalable connection-based resource are disclosed. In an example embodiment, request-generating Clients (e.g., processes or applications, etc.) generate and send requests to a Connection-Based Resource (e.g., a backend service or process or similar). A Request Priority Manager, between the Clients and the Connection-Based Resource, receives the request traffic from the Clients and routes the requests to particular instances of the Connection-Based Resource (over established connections between the Request Priority Manager and the Connection-Based Resource, in embodiments).

In embodiments, a Request Priority Manager may start and stop (enable/disable or apply/halt, etc.) prioritization of processing of traffic requests, based on scaling information (e.g., a scaling state or capacity) of the Scalable Connection-Based Resource. For a Scalable Connection-Based Resource that is near-to or approaching a maximum scaling limit, based on either a configuration setting (e.g., a configurable maximum scaling limit or threshold) or based on physical limits of the resources processing the request traffic) for example, the Request Priority Manager may start prioritizing portions of the traffic (e.g., by type or otherwise) such that lower-priority traffic is throttled (e.g., delayed or dropped, etc.) so that higher-priority or critical portions of the traffic requests are processed. Such a Request Priority Manager may facilitate improved processing over other systems because the Request Priority Manager continues to successfully process high-priority or critical traffic requests despite the Scalable Connection-Based Resource approaching, or reaching, a point where processing of the entirety of the traffic requests may be delayed or fail in an indiscriminate fashion.

In embodiments, a Request Priority Manager may scale various resources such as connections carrying request traffic to and/or from the Request Priority Manager and/or may instruct the target Scalable Connection-Based Resource to scale. The Request Priority Manager may start prioritizing portions of the traffic over the connections, such as but not necessarily limited to, when either the connections are nearing maximum scale capacity or when resources of the Connection-Based Resource are nearing a maximum scale capacity.

The Request Priority Manager may be scaling-aware in various different ways, and use information about scale (e.g., scaling information or state, or responses to requests indicating a maximum scale has been reached) to enable/disable prioritized routing of request traffic. For example, if the connections over which the traffic is transmitted (e.g., some or all of the various connections from the Clients to the target Connection-Based Resource) have reached a maximum scale, or if the target Connection-Based Resource has reached a maximum scale, and traffic continues to grow, overwhelming the maximum scale of components of the system, there is risk of dropped or delayed requests/responses. Without the priority-based routing described herein, such drops/delays may be performed indiscriminately, or at least in a manner that does not necessarily align with business objectives associated with the requesting Client. In embodiments, the Request Priority Manager may, based on one or more scaling characteristics of the system, determine to enable priority-based traffic request routing. For example, a Client may specify a priority of various different types of requests (e.g., based on Client-based priorities, reflecting business logic, in embodiments) based on characteristics of the requests (such as based on the target object identified in database request, or based on a source ID of a request, as a few non-limiting examples). Such priority may be specified by the client via a priority policy, for example. The Request Priority Manager 110 may route the requests in accordance with the specified priority when some scaling metric has reached some threshold value, for example, and then return to normal, performing (non-priority) routing to the Connection-Based Resource when some scaling metric falls back from some threshold value (when some part of the system is no longer at, near, nor approaching maximum scale).

In one non-exhaustive example used throughout the Detailed Description, a database service is used as one example of a Connection-Based Resource, but embodiments of other services are also contemplated, without limitation. The database service (e.g., a transactional database or other, using a connection pooler or not) hosts a database server on behalf of clients or customers across one or more servers (e.g., single or multi-master and read replica databases). Requesting Clients, such as an application (e.g., such as but not limited to a microservices application) may use a database server that requires many database connections to insert, update and read database objects. The database can host multi-tenant applications to save on hosting dedicated databases, in a non-limiting example.

Continuing with the example, if a connection pooler is used, the connection pooler may instruct or request for new database instances to be created, based on client needs for example (e.g., when the database writer instance starts to run out of resources). For example, a single database writer may be used to host different application use cases, and if the resources of that database server are exhausted, the application service can be interrupted (e.g., transactional flows can break in the middle, an unsatisfactory outcome). In embodiments, the connection pooler scales and contracts autonomously based on client demand. Existing database connections may be reused to reduce database anthropogenic effects caused by volatile client demand.

At least some embodiments described herein utilize a Request Priority Manager including or separate from a feature such as a connection pooler endpoint (load balancer-based or otherwise) in front of a Connection-Based Resource. In an embodiment wherein the Connection-Based Resource is a database service, the Request Priority Manager may be in front of the database writers and readers to manage communications between Requesting Clients (e.g., users, applications, etc.) and the database servers.

In embodiments, the Request Priority Manager (e.g., including a connection pooler, or otherwise) ensures that enough database resources are available and may request for resources of the database to scale as needed (e.g., bring on more databases readers or writers, for example). In embodiments, the Request Priority Manager prioritizes critical requests of the Connection-Based Resource (e.g., in the case of a database service, such as but not limited to database objects (tables, views and users)) when available resources of the database cross thresholds to maximize application availability and throughput. In an example, the Request Priority Manager may receive (or intercept, in some architectures) requests directed to the Connection-Based Resource (e.g., database requests) and route the requests based on characteristics of the requests it prioritizes (e.g., based on the database objects it prioritizes, according to a priority policy (sometimes referred to as a prioritization policy)).

In a non-exhaustive example, in the case where a Request Priority Manager works in concert with a connection pooler to route incoming requests targeting a Connection-Based Resource such as a database service, the pooler can maintain a list of potential Connection-Based Resource instances (e.g., database instances). If there are none available, the connection pooler can request a new instance. The connection pooler receives requests (e.g., like $dbuser or $object). The Request Priority Manager can prioritize specific $user or $objects requests (read or write) based on pre-defined policy. For example, the Request Priority Manager may prioritize a critical path of an application: facilitating placement of new orders and getting the orders delivered, in the case of an order fulfillment micro service and/or corresponding objects such as orders, deliveries, etc. The Request Priority Manager may determine an anomalous pattern (e.g., performance-based or security-based anomalies, etc.) in the request traffic (e.g., based on use of an artificial intelligence service or component to identify or determine the pattern) and modify a respective priority policy to change a prioritization for new request traffic corresponding to the anomalous pattern. The Request Priority Manager may issue alerts when the database usage is anomalous to mitigate database hacks caused by Requesting Clients such as an application outside of the database.

In another non-exhaustive example, providing a description of a data flow in the context of a Request Priority Manager for a scalable connection-based resource (e.g., a database) an application opens a connection to the database and issues a request (e.g., a $dbuser set/get a new $object (e.g., orders)). In the example, the request is routed via a network load balancer (transport layer (TCP)) to a traffic Request Priority Manager with a connection pooler instance. The connection pooler receives the request (get the $dbuser and $object) and determines whether it has enough resources to serve the request. If the connection pooler has enough resources, it routes the request to one of the available database instances (e.g., insert/update/delete requests go to the database writer, while selects go to one of the database read replicas).

If the connection pooler(s) is/are at some threshold level (e.g., such as but not limited to 75% of maximum connection pooler capacity) the connection pooler instance spawns more instances like itself (e.g., such as but not limited to, increase 10% of the current connection pooler fleet). Such spawning may eventually trigger database writer scaling, in embodiments. If the maximum scale of connection poolers has been reached, the Request Priority Manager can enable priority-based routing, dropping unnecessary request traffic, and passing only critical request traffic ($dbuser and $object) to the database, in one example. Over time, Client demand may fall (request traffic decreases), traffic prioritization may end (all traffic may pass through) and as the connection pooler instance becomes idle, the connection pooler instances are reduced in number.

In embodiments, the connection poolers (or the Request Priority Managers) publish metrics to a centralized datastore (e.g., a logging and monitoring management tool or service) and issue alerts when anomalous usage patterns are detected. In some embodiments, the Request Priority Manager determines and sends security alerts based upon anomalies in network traffic patterns caused by abnormal resource usage.

In some embodiments, priority-based routing may be implemented as a filter that is always enforced, in accordance with the prioritization features specified in one or more priority policies. Enforcement may mean that routing of the requests is performed in accordance with a priority policy that specifies normal routing if a maximum scaling threshold has not been reached and priority-based routing when a maximum scaling threshold is exceeded, for example.

At least one technical problem addressed by some of the disclosed embodiments of systems and techniques described herein is that clients (e.g., network-based applications such as websites, various processes, or the like) that rely on connection-based resources can be interrupted when the connection-based resource is unable to process all of the requests from the client in a timely fashion. In a database example, a single database writer may be used to host different client application use cases. If the resources of that database server are exhausted, the client application may be interrupted. For example, the connection-based resource (the database server) may drop requests from the client application indiscriminately, or at least not in a manner coinciding with the business logic associated with the client application. Such indiscriminate interruptions hinder client application processes, such as transactional flows that unexpectedly break in the middle due to the indiscriminate drops by the connection-based resource, for example.

Embodiments described herein provide a technical solution to some such problems and constitute an improvement to computer-related technology. For example, embodiments of scaling-aware traffic request prioritization for a scalable connection-based resource utilize a Request Priority Manager in front of database writers and readers to manage communications between client-based users (e.g., applications or other types of request-making client) and database servers such that, even as traffic transmission and/or processing reaches and/or grows beyond a maximum scale of the respective resources, prioritized traffic is more likely to be transmitted and processed. For example, for the case where the Request Priority Manager has a Connection Pooler, the Connection Pooler can scale and contract autonomously based on client demand; and existing database connections can be reused to reduce database anthropogenic effects caused by volatile client demand. In some such architectures the technical benefits may include one or more of: (1) ensuring that enough database resources (or other type of back-end resources) are available and triggered to scale as needed (2) prioritizing critical requests of database objects (tables, views and users) (or other types of backend resources) when available database resources cross maximum scaling thresholds to maximize application availability and throughput and (3) triggering performance-based or security-based alerts based upon anomalies in network traffic patterns caused by abnormal resource usage.

Attention is now brought to the Figures. The following description begins by describing logical components of FIG. 1 that may perform functionality in FIGS. 3 and 4 and then goes on to describe logical components of FIG. 2 that may perform functionality of FIGS. 3-6, although, components from different block diagrams may perform functionality from different process diagrams, in embodiments. Generally, FIGS. 1, 2, 7 and 8 illustrate logical components of a system or device(s), one or more of which may perform some or all of the features illustrated in FIGS. 3-6, in various combinations. For example, the Request Priority Manager 110 may perform the scaling-aware traffic request prioritization techniques illustrated in FIGS. 3-4, for a Scalable Connection-Based Resource 130. It is contemplated that other components than those illustrated may perform some of the disclosed functionality, in some embodiments, and/or that various of the disclosed functionality may be performed in a different order then that described in the example embodiments provided herein. For example, a system or device may perform scaling-aware traffic request prioritization techniques illustrated in FIGS. 3-4 with or without a connection pooler, or at least some of the functionality illustrated in FIGS. 3-6 and described herein may be performed by a portion of a Request Priority Manager (e.g., Request Priority Manager 110) co-located with a Connection Pooler 220 and a portion of the Request Priority Manager, or another separate Request Priority Manager (e.g., Request Priority Manager 210) co-located with the Scalable Connection-Based Resources. In some embodiments, Request Priority Manager 210 may include some or all of the features illustrated for Request Priority Manager 110 (e.g., one set of priorities may be applied at Request Priority Manager 110, while another set of priorities may be applied at Request Priority Manager 210, for example). A service-provider, network-based embodiment is then described, in accordance with FIG. 6, components of which may perform some or all of the functionality illustrated in process diagrams 3-6, for example.

It is contemplated that in at least some embodiments, functionality associated with the Request Priority Manager 110 may be performed at a frontend component (e.g., at a frontend database engine or similar). In some embodiments, the Scalable Connection-Based Resource 130 may include resources of a backend component (e.g., database read/write instances) without limitation.

FIG. 1 is a block diagram that illustrates a logical architecture of a system for scaling-aware traffic request prioritization for a scalable connection-based resource, according to some embodiments. In FIG. 1, Clients 102A, 102B, . . . , 102Z send request traffic 120 to a connection-based resource (e.g., illustrated as Scalable Connection-Based Resource 130). A Request Priority Manager 110 is illustrated and performs routing of the traffic 120 in-between the Clients 102 and the Connection-Based Resource 130. In the illustrated embodiment, Request Traffic 120 may include individual requests, sent over connectionless links, or over relatively short-lived links, while the Connections 140 between the Request Priority Manager 110 and the Scalable Connection-Based Resource 130 may be relatively longer-lasting connections, over which groups of the requests are transmitted (e.g., maintained by a Connection Pooler, in embodiments). The Request Priority Manager 110 routes the request traffic 120. In embodiments, the Request Priority Manager 110 sometimes routes the traffic normally, without prioritization (e.g., when the connection-based resource and connections 140 are sufficient to process all of the traffic) and at other times, routes only prioritized traffic (e.g., when the connection-based resource and connections 140 are insufficient (or are nearing a threshold where they begin to become insufficient) to process all of the traffic).

In embodiments, the priority may be specified by the client. For example, a customer of a service provider may specify (e.g., via a priority policy) prioritization of the traffic in a manner that coincides with customer business logic. Using such policies to limit the routing to requests that have a higher priority over other requests may increase the likelihood that higher priority requests are not indiscriminately dropped or delayed. Providing client-specification of the priority for requests facilitates client-based control for determining which requests are dropped or delayed.

Figure 3:
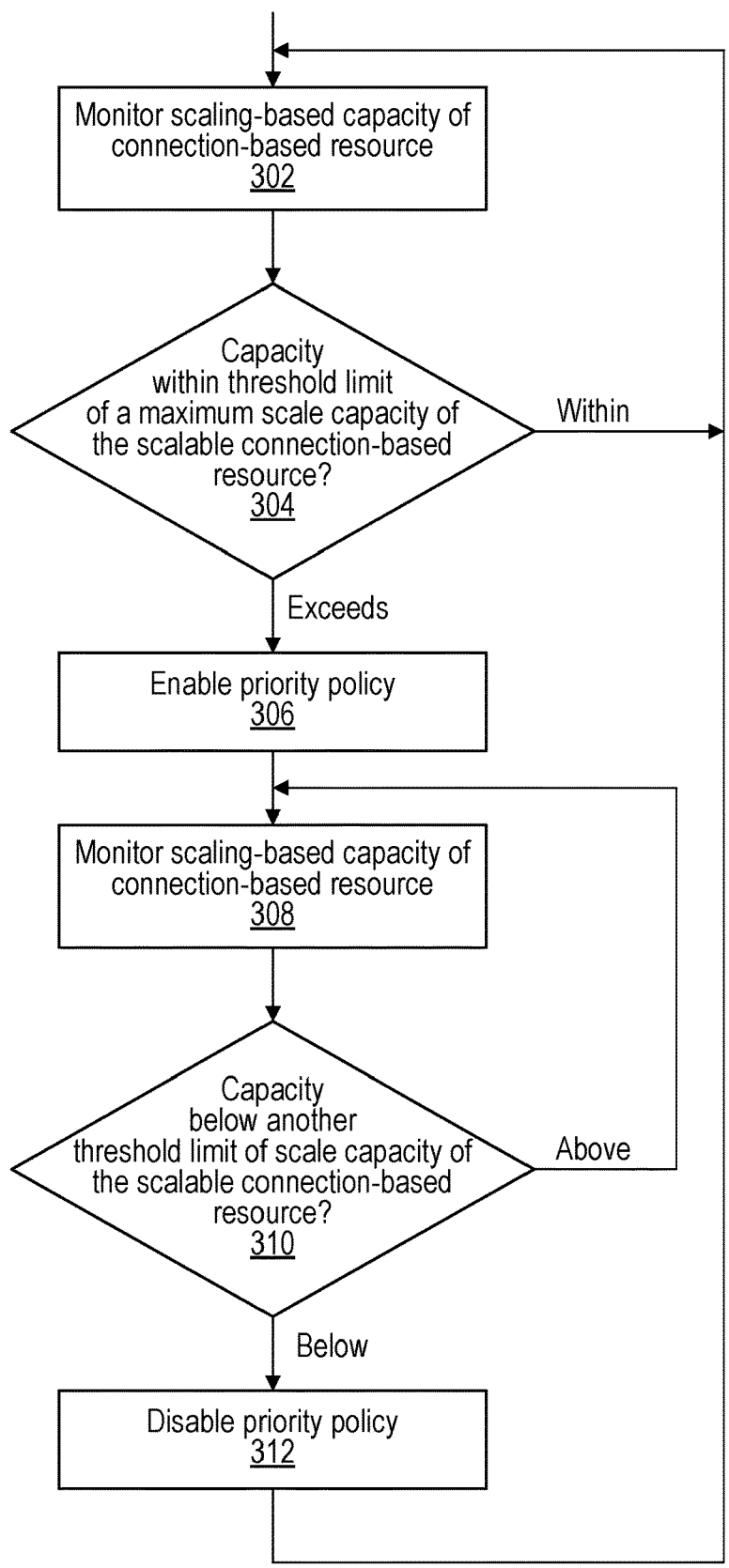
FIG. 3 is a process diagram that illustrates a process for scaling-aware traffic request prioritization for a scalable connection-based resource, according to some embodiments.

FIG. 1 illustrates Request Priority Manager 110 that receives request traffic 120 for a Scalable Connection-Based Resource 130 from clients 102A-Z. A Connection-Based Resource Scale Capacity Monitor 116 monitors a scaling-based capacity (e.g., a connection capacity or request processing capacity of the Scalable Connection-Based Resource 130). In response to a determination that the Scalable Connection-Based Resource 130 is at, near-to or within a threshold limit of a maximum capacity for the Scalable Connection-Based Resource, the Request Priority Manager 110 determines to begin applying a priority policy (e.g., obtained from, or according to a policy stored in, Priority Policy Data Store 118) to newly received request traffic for the Scalable Connection-Based Resource 130 to prioritize some requests over others. Note that the Request Priority Manager 110 can stop applying the priority policy to newly received request traffic for the scalable connection-based resource in response to a determination that the Scalable Connection-Based Resource is not at or within another threshold limit of the maximum capacity for the scalable connection-based resource (e.g., as illustrated in FIG. 3, described below).

In embodiments, the priority policy (e.g., specified by a client and stored in Priority Policy Data Store 118) specifies characteristics of the requests (e.g., types of or IDs for data objects stored at the Scalable Connection-Based Resource 130; requestor identifiers (IDs) etc.) and/or a corresponding priority for the characteristic. The Request Priority Manager 110 may apply the priority policy to prioritize requests having the characteristics (e.g., requests that access the data objects specified in the priority policy or that originate from a source corresponding to, or are sent on behalf of, the requestor ID).

In a further example of prioritization based on a target object, clients may generate, configure, or otherwise determine priority policies for certain tables. For example, tables containing time-sensitive or critical data (e.g., order tracking for an ecommerce site) may be given a higher priority than other tables such as, but not limited to logging for auxiliary, non-critical functions such as garbage collection processes or the like. By using priority policies that give the requests targeting the tables containing time-sensitive or critical data a higher priority over auxiliary, non-critical functions the system increases the likelihood that the time-sensitive or critical data are processed in a timely fashion, thereby helping to maximize client application availability and throughput.

Different priority policies may be specified for different Clients 102, for different types of traffic (e.g., database traffic vs. micro-service-based traffic, etc.).

Scalable Connection-Based Resource 130 is illustrated with Resource Instance Scaling Manager 132, which may manage and/or control scaling of the Resource 130. In some embodiments, Resource Instance Scaling Manager 132 may receive scaling instructions from Request Priority Manager 110.

Figure 2:
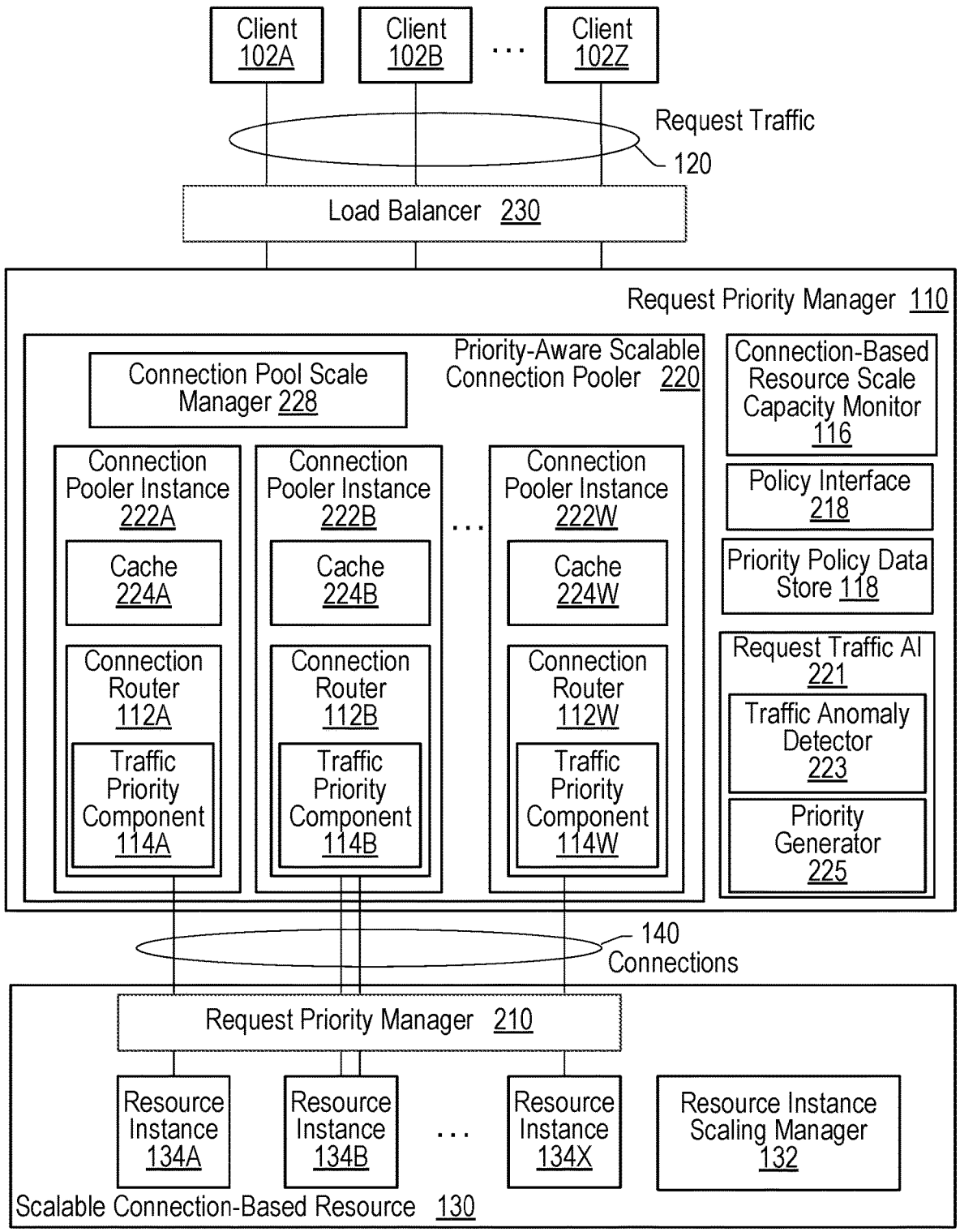
FIG. 2 is a block diagram that illustrates a logical architecture of a system, with a connection pooler, for scaling-aware traffic request prioritization for a scalable connection-based resource, according to some embodiments.

FIG. 2 is a block diagram that illustrates a logical architecture of a system, with a Priority-Aware Scalable Connection 220, for scaling-aware traffic request prioritization for a Scalable Connection-Based Resource 130, according to some embodiments. FIG. 2 illustrates that the Request Priority Manager 110 includes a Connection Pooler 220. The Connection Pooler 220 may, for example, establish front-end connections with request-making Clients 102A-Z for receiving the request traffic 120 for the Scalable Connection-Based Resource 130 and maintain a pool of backend connections 140 to the Scalable Connection-Based Resource 130 for sending the request traffic 120 to the Scalable Connection-Based Resource 130. For example, a Connection Pooler Instance 222A may receive connection requests from Clients 102A and 102B, and route traffic resulting from those connection requests over an already-existing-at-the-time-it-was-received connection 140 to the target Connection-Based Resource 130. The Connection Pooler Instance 222A may continue to maintain the Connection 140 to the Connection-Based Resource 130, even after connections to the requesting Clients 102A, 102B have ended (e.g., to service further client connection requests). FIG. 2 illustrates Connection Pool Scale Manager 228, that may manage scaling of the Connection Pooler Instance 222A, 222B, . . . , 222W, in response to increases or decreases in the request traffic 120, for example.

In at least some embodiments, Request Traffic 120 from Clients 102A-Z may pass through and be load-balanced by a Load-Balancer 230 prior to reaching the Priority-Aware Scalable Connection Pooler 220.

Priority-Aware Scalable Connection Pooler 220 is illustrated with Connection Pooler Instances 222A-W, each including a Cache 224 and Connection Router 112 and Traffic Priority Component 114. In embodiments, Caches 224A, 224B, . . . , 224W are used by respective Connection Pooler Instances 222A-W to cache local copies of corresponding priority policies. Generally, connection pooler instances are assigned traffic from particular ones of the Clients 102A-Z (e.g., by Connection Pool Scale Manager 228) and aggregate the requests. Respective Connection Routers 112A, 112B, . . . , 112W route the requests to respective Resource Instances 134A-X over respective connections 140. When a (locally-cached) priority policy is enabled (e.g., by Traffic Priority Component 114A) respective traffic directed via Connection Pooler Instance 222A is prioritized in accordance with the corresponding priority policy, by a respective Traffic Priority Component 114A, for example.

FIG. 2 illustrates a Priority Policy Data Store 118 for storing client-specified policies that describe how the requests are to be prioritized, when enabled. In the example, to apply a priority policy the Request Priority Manager 110 determines, according to the corresponding priority policy, which requests of the request traffic 120, received via front-end connections from the Clients 102A-Z, are sent over the backend connections 140 to the Scalable Connection-Based Resource 130.

In embodiments, responsive to an increase in the request traffic 120 for the Scalable Connection-Based Resource 130, the Connection Pooler 220 may request additional backend connections 140 to the Scalable Connection-Based Resource 130 to increase a number of connections in the pool of backend connections 140. In some embodiments, the determination that the Scalable Connection-Based Resource 130 is at or within the threshold limit of the maximum capacity is based on the ability of the Scalable Connection-Based Resource 130 to accept additional backend connections 140.

FIG. 2 illustrates that the Scalable Connection-Based Resource 130 includes a group of Resource Instances 134A, 134B, . . . , 134X that establish the backend connections 140 with the Connection Pooler 220 and that process requests from the request traffic received via respective connections of the backend connections 140. In embodiments, the Scalable Connection-Based Resource 130 is scalable to increase or decrease a number of Resources Instances 134A-X in the group of resources instances. In embodiments, the Request Priority Manager 110 requests that the Scalable Connection-Based Resource 130 increase the number of Resource Instances 134 in the group of resources instances (e.g., in response to an indication that the Scalable Connection-Based Resource 130 is unable to provide more additional backend connections via the existing resource instances).

In the illustrated embodiment, FIG. 2 illustrates Request Priority Manager 210 located at the Scalable Connection-Based Resource 130. It is contemplated that in various embodiments, independent Request Priority Managers may be implemented in middleware between the Clients 102 and Connection-Based Resource 130 (e.g., as part of load balancer, as part of a router, etc.) or as part of the Connection-Based Resource 130, or that a distributed Request Priority Manager may be implemented in multiple parts, as illustrated in FIG. 2, enabling various different types of prioritization (e.g., prioritization based on source of request, prioritization based on target storage object indicated in the request), at different network points, for example. In FIG. 2, the Request Priority Manager 210 receives request traffic for the Scalable Connection-Based Resource 130 routed over the backend connections 140 by the Connection Pooler 220 and monitors the connection capacity or request processing capacity of the Scalable Connection-Based Resource 130.

The Request Priority Manager 110 is illustrated with a Resource Scale Capacity Monitor 116 for monitoring the Connection-Based Resource 130. In some embodiments the Resource Scale Capacity Monitor 116 may determine the scale and/or track the scaling state of the Connection-Based Resource 130 based on responses to requests, by the Request Priority Manager 110, to add connections or additional resources, or may interact directly with the Connection-Based Resource 130 (e.g., via API or otherwise) to determine the scale and/or track the scaling state of the Connection-Based Resource 130.

In embodiments, in response to a determination that the Scalable Connection-Based Resource 130 is at or within a threshold limit of a maximum capacity for the Connection-Based Resource, the Request Priority Manager 210 begins applying another priority policy to newly received request traffic for the Scalable Connection-Based Resource 130, in order to prioritize some requests over others. In at least some embodiments, the other priority policy is different from the priority policy applied or enabled by Request Priority Manager 110. The policy applied by Request Priority Manager 210 may be stored local to the Connection-Based Resource 130 or at Priority Policy Data Store 118, in various embodiments.

FIG. 2 illustrates Policy Interface 218, a public-facing, customer-facing, or administrative-level interface (e.g., application program interface (API), command-line interface (CLI), graphical user interface (GUI) or other interface) via which characteristics of requests that are used to group the requests into request types (e.g., based on one or more characteristics of the requests, such as based on the source of the request, based on a target of the request, based on a security level of the request, based on whether the request falls into an anomalous category, etc.) and via which priorities of the requests (priority of the request types) may be specified. The Policy Interface 218 may be used to generate new policies and/or update policies, in embodiments.

FIG. 2 illustrates a Request Traffic Artificial Intelligence Component 221 that is illustrated with Anomaly Detector 223 and Priority Generator 225. In embodiments, Anomaly Detector may detect anomalies in the request traffic (e.g., via a combination of machine learning and/or artificial intelligence techniques applied to the traffic through the Connection Pooler Instances 222A-W or applied to metrics from a metrics and/or logging and monitoring service (described with regard to FIG. 6, below) about the traffic or about performance of system components, etc.). For example, data used by the artificial intelligence techniques may be obtained via local monitoring and logging agents at the Connection Pooler Instances 222A-W. The Traffic Anomaly Detector may obtain metrics about the traffic from the local agents to create a larger, global picture of the traffic, in order to identify anomalies in the overall traffic, in embodiments.

In embodiments, the machine learning or artificial intelligence techniques may make use of historical request traffic data, known patterns, and the like to identify anomalies and generate and transmit alerts indicating the anomalies.

Priority Generator 225 may monitor whether traffic is being routed in a prioritized manner. In some embodiments, Priority Generator 225 may increase a priority of non-anomalous traffic, or decrease priority of traffic determined anomalous based on anomalies detected by Traffic Anomaly Detector 223. For example, for traffic associated with a source designated as priority, if the Traffic Anomaly Detector 223 determines that traffic to begin having anomalous characteristics (e.g., a large change in volume or type of traffic at unexpected times, a change in the target object, etc.) the Priority Generator 225 may reduce the priority designation for data from that source (in a system with multiple layers of priority), or give the traffic a non-priority status. In at least some embodiments, priority generator may generate, based on applying artificial intelligence and/or machine learning techniques to the traffic, priorities for processing the traffic. The generated priorities may be used to generate new policies, to modify Client-specified polices, and similar.

FIG. 3 is a process diagram that illustrates a process for scaling-aware traffic request prioritization for a scalable connection-based resource, according to some embodiments. Various aspects of the illustrated process may be performed by one or more components illustrated in FIGS. 1, 2, 7 and/or 8, such as by one or more components of a Request Priority Manager 110.

At block 302, scaling-based capacity of a connection-based resource is monitored, by Connection-Based Resource Scale Capacity Monitor 116 of Request Priority Manager 110. For example, the Monitor 116 may interact with Scalable Connection-Based Resource 130 to monitor the scaling of the Resource 130 or the Monitor 116 may track responses to requests for additional connections and/or responses to requests to scale resources, made by the Request Priority Manager 110 to the Scalable Connection-Based Resource 130. In at least some embodiments, the Monitor 116 may monitor the scaling-based capacity and store or use information indicative of a scaling state of the Resource 130. Metrics, based on the monitoring may be published.

At block 304, a determination is made whether the scaling-based capacity of the Connection-Based Resource 130 is within a threshold limit of a maximum scale capacity of the Resource 130. For example, the Request Priority Manager 120 may determine, based on comparison of scale information about the capacity of the Resource 130 (e.g., a state tracked an updated by the Scale Capacity Monitor 116) to a (configurable) threshold limit of maximum capacity (the threshold limit may be a value less than an actual maximum scale allowed or the actual maximum scale value, in embodiments), or based on a response from the Connection-Based Resource 130 indicating that the Resource 130 cannot scale further, that a maximum capacity of the scalable connection-based resource, or a capacity approaching the maximum capacity has or has not been reached. If the capacity falls within the threshold limit (block 304, Within) the process returns to monitoring the capacity (block 302). But if the capacity exceeds the threshold limit (or if a response is received from the Connection-Based Resource 130 indicating that the Resource 130 cannot scale further) a corresponding priority policy is enabled (block 306), by Traffic Priority Component 114 of Request Priority Manager 110, for example. In embodiments, the Request Priority Manager 110 may send messages to the Connection Pooler Instances 222A-W instructing prioritization-based routing. Traffic Priority Component 114 may, for an enabled priority policy, route request traffic in accordance with the enabled priority policy.

At block 308, the scaling-based capacity of the Connection-Based Resource is monitored, by Resource Scale Monitor 116, in embodiments. Metrics, based on the monitoring, may be published. At block 310, a determination is made whether the scaling capacity of the Scalable Connection-Based Resource 130 has fallen below another threshold limit of capacity of the Resource 130 (the thresholds in blocks 304 and 310 may be different, in embodiments). If the capacity remains above the other threshold limit (e.g., if the scale remains at or near maximum scale) the process returns to block 308 (monitoring). Once the capacity falls below the other threshold limit (block 310, Below) the priority policy is disabled (block 312) (e.g., by Traffic Priority Component 114) and request routing returns to normal (normal meaning routing without prioritization resulting in intentionally dropped or delayed requests) such as round-robin or another load-balancing based scheme. For example, the Request Priority Manager 110 may send messages to the Traffic Priority Components 114A-W of Connection Pooler Instances 222A-W instructing prioritization-based routing to be disabled.

Figure 4:
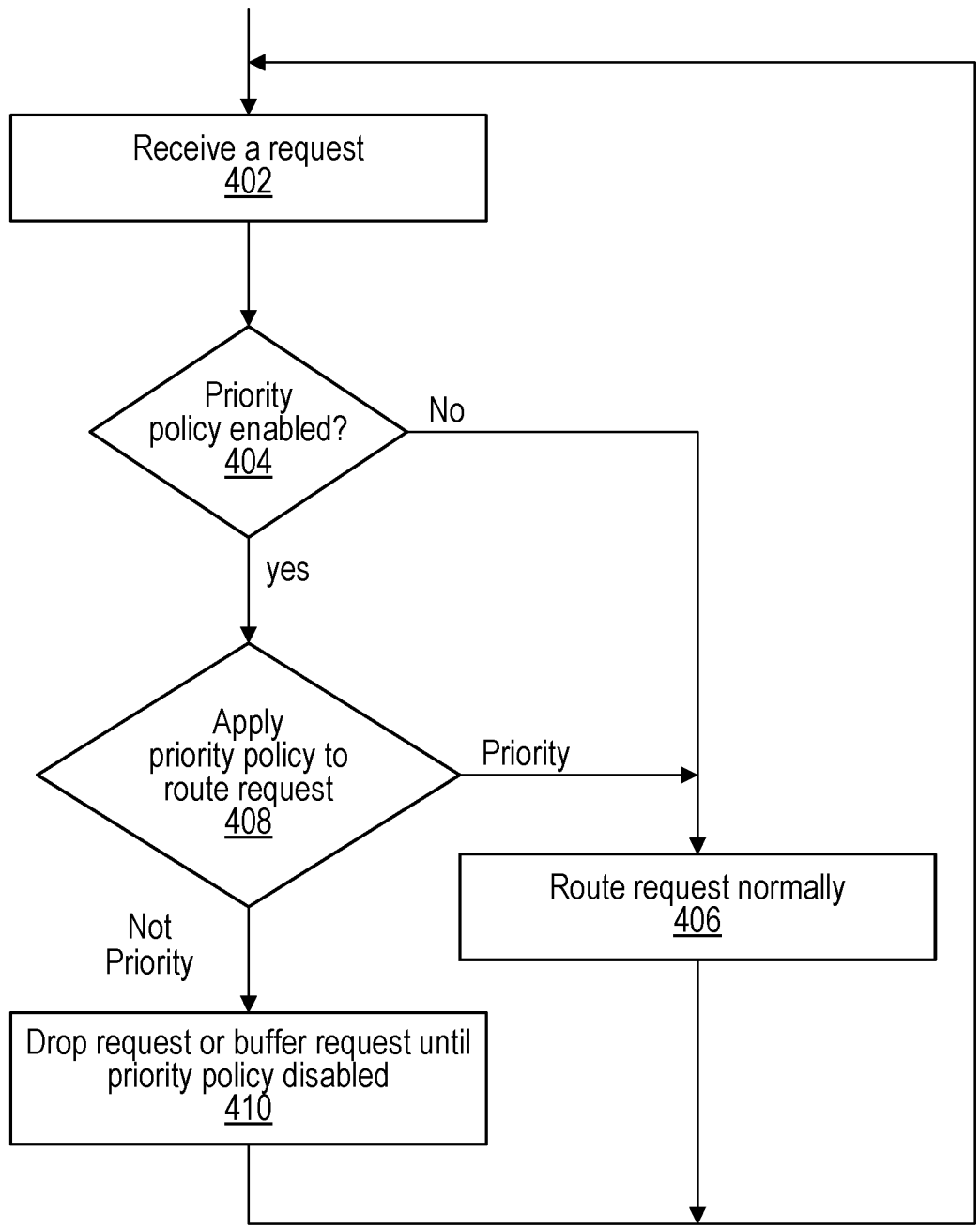
FIG. 4 is a process diagram that illustrates a request processing process for a connection pooler instance within the context of scaling-aware traffic request prioritization for a scalable connection-based resource, according to some embodiments.

FIG. 4 is a process diagram that illustrates a request processing process for a connection pooler instance within the context of scaling-aware traffic request prioritization for a scalable connection-based resource, according to some embodiments. In the following description, the process is described within the context of a Connection Pooler Instance 222A, but may be practiced in other embodiments.

At block 402, a request is received (e.g., from a Client 102A and by Connection Pooler Instance 222A). If a priority policy is not enabled (block 404, No) the request is routed normally (block 406) (by Connection Router 112A, for example). For the case where the priority policy is enabled (block 404, Yes) the priority policy is applied to route the request (by Traffic Priority Component 114A). Using FIG. 1 as an example, to apply the priority policy the Request Priority Manager 110 determines, according to the priority policy, which requests 120 received via the respective frontend connections are sent over the backend connections 140 to the Scalable Connection-Based Resource 130. In the illustrated example in FIG. 4, if the request is determined to be a priority (block 408, Priority) the request is processed, normally (block 406). If the request is determined to not be a priority (block 408, Not priority) the request is dropped or buffered until processing via priority policy is disabled (block 410) or for some time-based delay period, etc. The process iterates for additional requests, and across respective ones of the Connection Pooler Instances 222A-W.

It is contemplated that more complex prioritization schemes may be implemented (e.g., with numerous levels of various priorities, wherein some traffic is transmitted immediately, other traffic is buffered for various different amounts of time, and some traffic is dropped entirely) without departing from the scope of this disclosure. For example, one prioritization scheme may prioritize requests associated with atomic transactions over requests not associated with an atomic transaction. Different levels of priority may be associated with different functionality: a first level of priority may be associated with high-availability routing, a second level may be associated with long-term buffering, a third priority level may be associated with short-term buffering (dropping the requests from a buffer after some maximum buffer time threshold) and a fourth priority level may specify that the requests be dropped entirely, guaranteeing that higher priority requests are routed.

Figure 5:
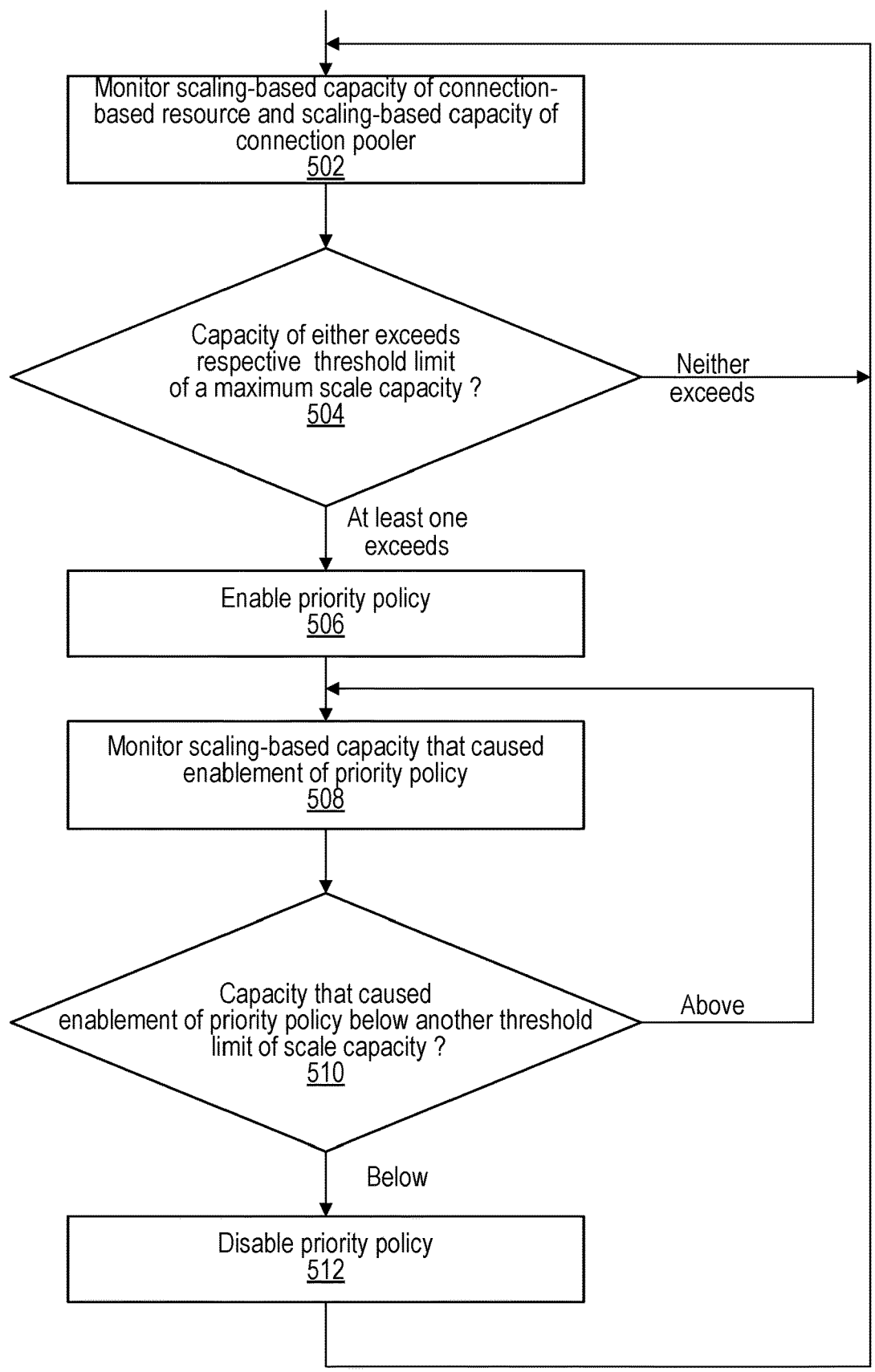
FIG. 5 is a process diagram that illustrates a process for scaling connection poolers and a connection-based resource, using scaling-aware traffic request prioritization, according to some embodiments.

FIG. 5 is a process diagram that illustrates a process for scaling connection poolers and a connection-based resource, using scaling-aware traffic request prioritization, according to some embodiments. Scaling-based capacity of a Connection-Based Resource 130 and scaling-based capacity of a Connection Pooler 220 are monitored (block 502), by a same, single component or process or by a Connection-Based Resource Scale Capacity Monitor 116 and a Connection Pool Scale Manager 228, respectively, in some examples. At block 504, a determination is made whether a capacity of either exceeds respective threshold limits of respective maximum scale capacity. In embodiments, each of the Connection-Based Resource 130 and the Connection Pool Scale Manager 228 have different threshold limits (e.g., client-configurable via Policy Interface 218, or determinable via a Request Traffic AI component 221 which may set or adjust or modify the thresholds, based on detected anomalies or based on traffic history).

If neither threshold is exceeded (block 504, Neither exceeds) the process returns to monitoring at block 502. If at least one of the thresholds is exceeded (block 504, At least one exceeds) a corresponding priority policy is enabled (block 506). For example, each of the Connection-Based Resource 130 and the Connection-Pooler 220 may be associated with different policies, or with a common policy, in various different embodiments. Different polices may specify different values for the thresholds. At block 508, scaling-based capacity that caused enablement of the priority policy is monitored. For example, if the threshold for the Connection Pooler 220 was exceeded and caused enablement of the priority policy, the scaling-based capacity of the Connection Pooler is monitored, and if the threshold of the Connection-Based Resource 130 was exceeded and caused enablement of the priority policy, the scaling-based capacity of the Connection-Based Resource 130 is monitored.

At block 510 a determination is made whether the capacity that caused enablement of the priority policy has fallen below another threshold limit of scale capacity. If the capacity remains above the other threshold limit (block 510, Above) the process returns to monitoring at block 508. Otherwise, for the case where the capacity that caused the enablement has fallen below the other threshold limit (block 510, Below) the priority policy is disabled (block 512). For example, instead of priority-based routing, the process may return to normal processing (e.g., round-robin based or whatever routing was being used prior to the priority-based routing, etc.).

In some embodiments, a scaling capacity of the Connection Pooler 220 or the Connection-Based Resource 130 (learned during the monitoring, or in response to a request for a connection for additional resource, for example) may be updated. For example, the system may monitor how much capacity is left to reach a maximum scale and may store that information, as a state of the capacity.

Figure 6:
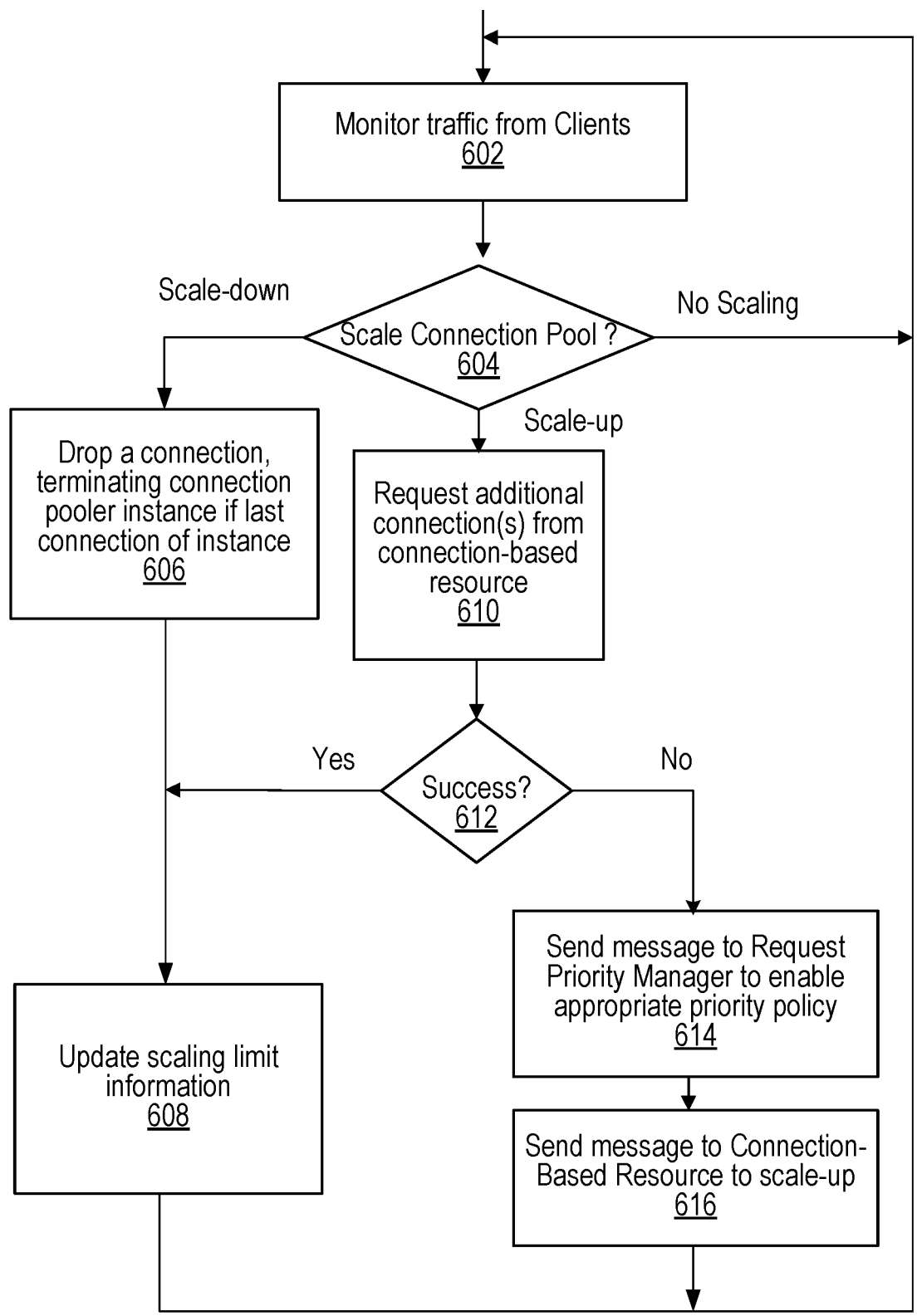
FIG. 6 is a process diagram that illustrates a scaling process for a connection pool within the context of scaling-aware traffic request prioritization for a scalable connection-based resource, according to some embodiments.

FIG. 6 is a process diagram that illustrates a scaling process for a connection pool within the context of scaling-aware traffic request prioritization for a scalable connection-based resource, according to some embodiments. At least portions of the process may be performed by a Connection Pool Scale Manager 228, in embodiments. The following description of FIG. 6 describes features that relate to functionality (e.g., provide information for the functionality described in, or otherwise interact with the components that perform the functionality) illustrated in FIGS. 3 and 5, in embodiments.

Request traffic 120 from Clients 102A-Z is monitored (block 602) by Connection Pool Scale Manager 228, for example. The Connection Pool Scale Manager 228 determines whether the Connection Pool needs to be scaled (block 604), based on the traffic for example. If not (block 604, No Scaling) the process returns to monitoring at block 602. If a determination is made to scale-down the Connection Pool (block 604, Scale-down) the Connection Pool Scale Manager 228 drops a connection (block 606). If the dropped connection is the last connection of a Connection Pooler Instance 222, the corresponding Connection Pooler Instance 222 may be terminated. Scaling limit information for the Connection Pool is updated, by the Connection Pool Scale Manager 228, for example.

In embodiments, due to the dropped connection/terminated Connection Pooler Instance the Connection Pool and Connection-based Resource 130 may have more room to scale up. The updated scaling limit information may be used by the separate Request Priority Manager processes (e.g., associated with the monitoring in FIGS. 3 and 5). For example, scaling down may mean that the Connection Pool is below a maximum scale threshold and can disable priority policy-based routing.

If it is decided to Scale-up (block 604, Scale-Up) the Connection Pool Scale Manager 228 requests an additional connection(s) from the Connection-Based Resource 130 (block 610). If the request is successful (block 612, Yes) the scaling limit information is updated, accordingly (block 608). The updated scaling limit information may be used by the separate Request Priority Manager processes, as noted above. For example, scaling up may mean that a threshold scale limit is met or exceeded and an appropriate priority policy must be enabled.

If the request is unsuccessful (block 612, No) the Connection Pool Scale Manager 228 can send a message to the Request Priority Manager 110 to enable an appropriate priority policy (block 614) and/or a message can be sent from the Request Priority Manager 110 or the Connection Pooler 220 to the Connection-Based Resource 130 to scale-up the Connection-Based Resources 130 (block 616). In some embodiments, a component distinct from the Connection-Based Resource 130 may send an instruction to the Connection-Based Resource 130 instructing the Connection-Based Resource to scale (e.g., in anticipation of an increase in request traffic that the Connection-Based Resource has not learned of yet, and/or in order to have resources to support additional connections 140) even if the Connection-Based Resource 130 is implemented with a monitor and scaling manager to manage scaling of the Connection-Based Resource 130.

Figure 7:
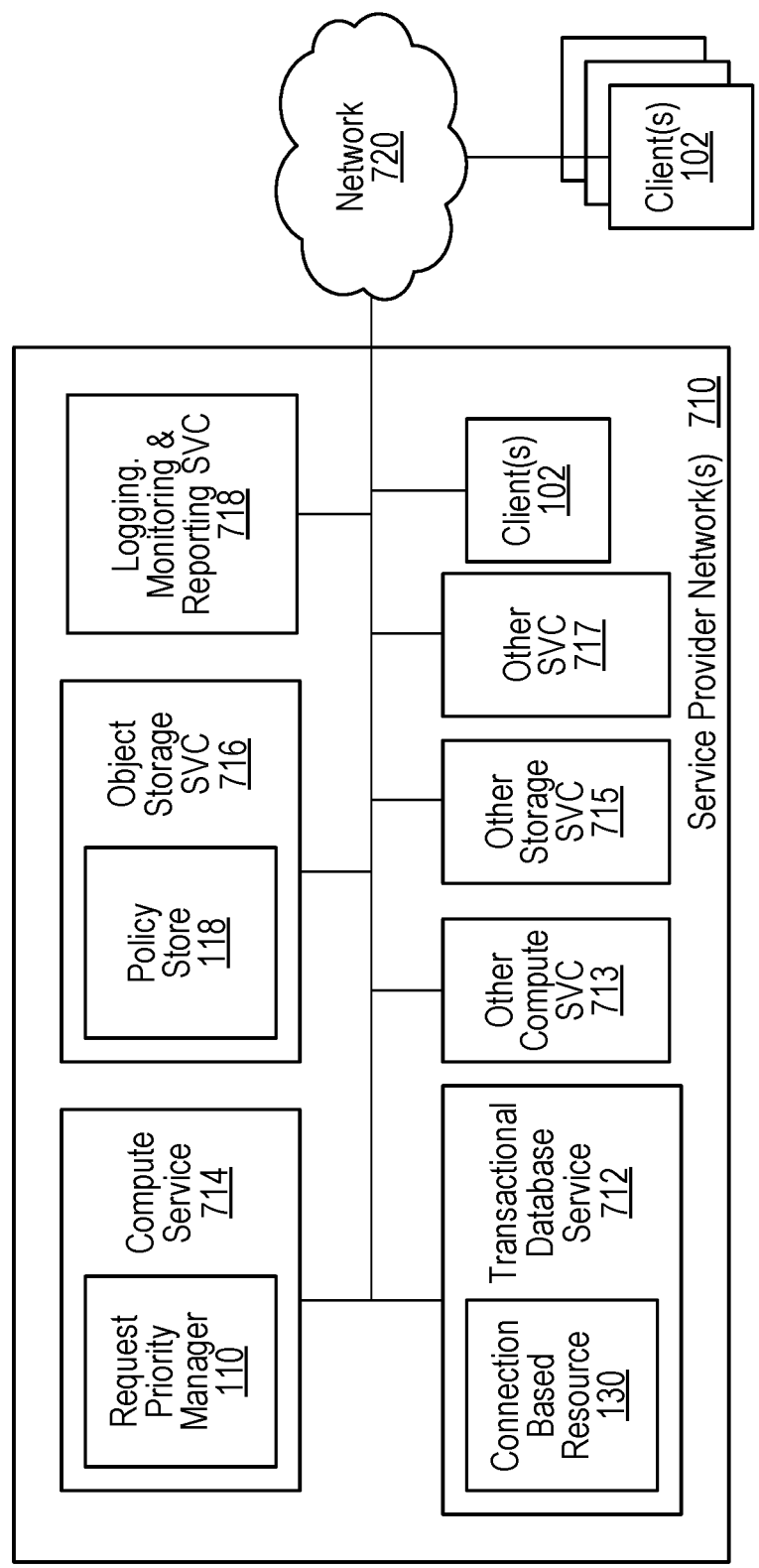
FIG. 7 is a block diagram that illustrates an example service provider network embodiment for scaling-aware traffic request prioritization for a scalable connection-based resource, according to some embodiments.

In embodiments, by adding a connection 140 to the Connection-Based Resource 130, all current resource instances at the Connection-Based Resource 130 may be at maximum capacity or scale (or close thereto) for the number of connections they can handle and it may look like Request Traffic 120 is still trending to increase, so the Scalable Connection Pooler 220 and/or Connection-Based Resource 130 may start bringing up a new instance (which may take various amounts of time, leading to delayed or dropped traffic requests). In embodiments, the Priority-Aware Scalable Connection Pooler 220 or the Request Priority Manager may send a request or instruction to the Scalable Connection-Based Resource 130, requesting additional resources, responsive to an increase in Request Traffic 120, for example FIG. 7 is a block diagram that illustrates an example service provider network embodiment for scaling-aware traffic request prioritization for a scalable connection-based resource, according to some embodiments. In the non-exhaustive, illustrated embodiment, various functionality described herein is distributed and performed by various Services of the Service Provider Network 710. Service Provider Network 710 is illustrated with internal and external Clients 102, Transactional Database Service 712, Compute Service 714, Object Storage Service 716, Logging Monitoring & Reporting Service 718, Other Compute Service 713, Other Storage Service 715, and Other Service 717 connected to external Client(s) 102, via Network 710.

Request Priority Manager 110 is illustrated as implemented, at least partially, via Compute Service 714 (e.g., an event-driven, stateless (sometimes referred to as serverless Compute Service) or a web service that provides secure, resizable compute capacity in the cloud, either via virtual, or non-virtual compute instances. In the illustrated embodiment, Connection-Based Resource 130 is illustrated as implemented via Transactional Database Service 712, but may be a Connection-Based Resource built from one or more other services provided by the Service Provider Network 710. For example, the Connection-Based Service 130 may be implemented via another type of database service, a managed database service, Relational and Non-Relational Database Services, etc. In some embodiments the Connection-Based Service 130 may be implemented via a compute service (e.g., an event-driven, stateless (sometimes referred to as serverless Compute Service) or a web service that provides secure, resizable compute capacity in the cloud, either via virtual, or non-virtual compute instances, or may be implemented via a combination of compute and storage services, in some embodiments.

While various external-to-the-service-provider-network Clients 102 and internal-to-the-service-provider-network Clients 102 are illustrated, it is contemplated that other processes, such as micro-services, applications (Client or service provider-based) or the like may be implemented via a combination of compute and storage services of the service provider network, and may act as Clients 102 of the Connection-Based Resource 130, in various embodiments.

Priority Policy Store 118 is illustrated as implemented at Storage Service 716 (e.g., an object storage service by the service provider, or similar) and Logging, Monitoring & Reporting Service 718 is illustrated as a service provided by the Service Provider Network 710. In embodiments, the Logging, Monitoring & Reporting Service 718 may perform at least some of the monitoring described herein, and/or may provide metrics for the Request Priority Manager 110 to use in making various determinations described herein.

Example Computer System

Figure 8:
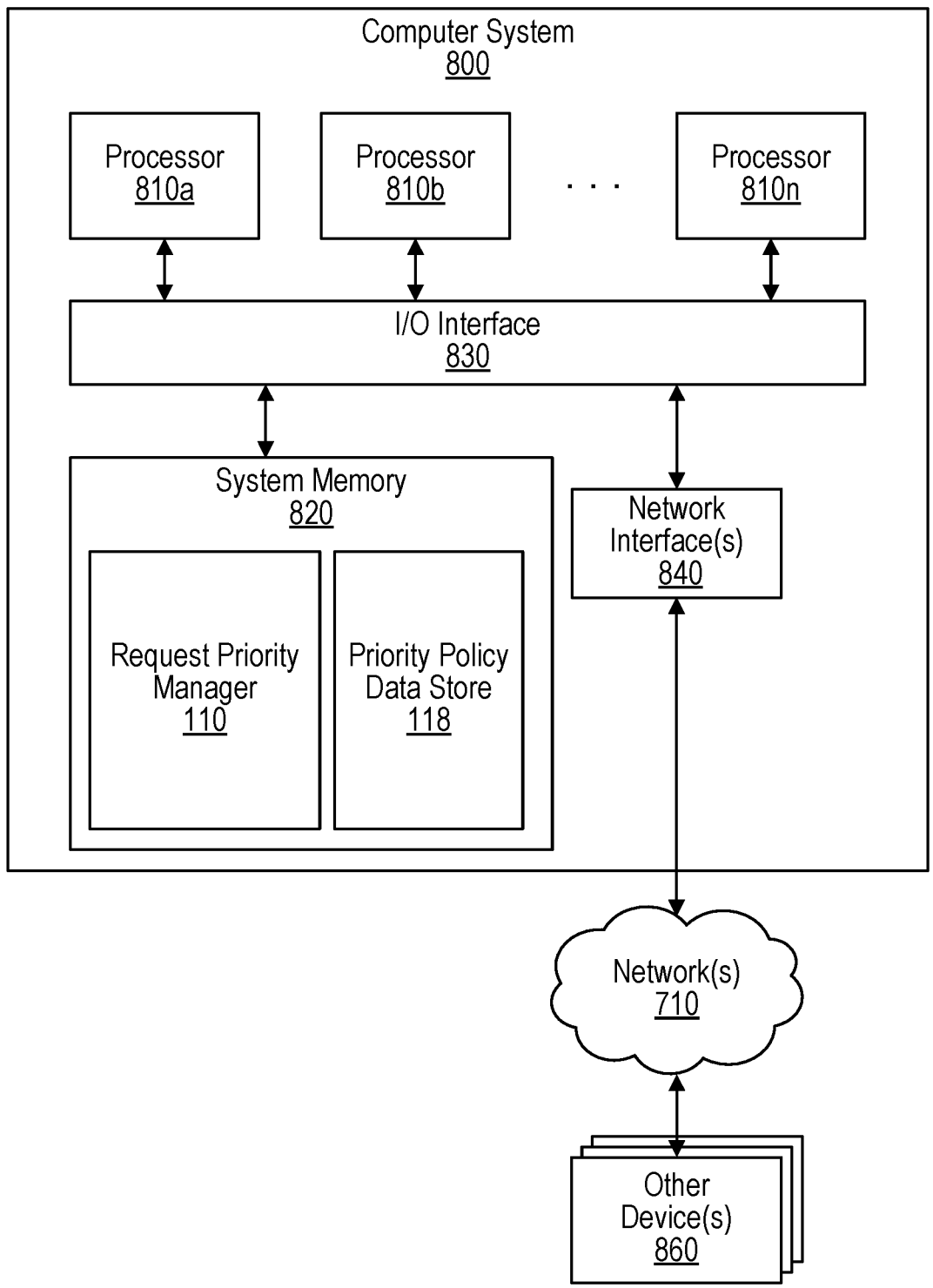
FIG. 8 illustrate an example of a computer system, one or more of which may implement various components associated with scaling-aware traffic request prioritization for a scalable connection-based resource, described and illustrated throughout the disclosure, according to embodiments.

FIG. 8 illustrates an example of a computer system, one or more of which may implement various components of scaling-aware traffic request prioritization for a scalable connection-based resource, described and illustrated throughout the disclosure, according to embodiments.

Various portions of systems in FIGS. 1, 2, 7 and 8 and/or methods presented in FIGS. 3-6, described herein, may be executed on one or more computer systems similar to that described herein, which may interact with various other devices of the system.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 860, such as cursor control device, keyboard, audio device, and display(s). In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for scaling-aware traffic request prioritization for a scalable connection-based resource may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 820 may be configured to store program instructions and/or data accessible by processor 810. In various embodiments, system memory 820 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for scaling-aware traffic request prioritization for a scalable connection-based resource, are shown stored within system memory 820 as Request Priority Manager 110 and Priority Policy Data Store 118, respectively. In other embodiments, program instructions and/or data may be received, sent, or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840. Program instructions may include instructions for implementing the techniques described with respect to any of the FIGS.

In some embodiments, I/O interface 830 may be configured to coordinate I/O traffic between processor 810, system memory 820, and any peripheral devices in the device, including network interface 840 or other peripheral interfaces, such as input/output devices. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network 810, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Computing device 800 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 800. Multiple input/output devices may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

Memory 820 may include program instructions (e.g., such as Request Priority Manager 110) and data (e.g., Priority Policies in Priority Policy Data Store 118) accessible by the program instructions. In one embodiment, program instructions may include software elements of a method illustrated in the above figures. Data storage 118 may include data that may be used in embodiments described herein. In other embodiments, other or different software elements and/or data may be included.

Those skilled in the art will appreciate that computer system 800 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present solution may be practiced with other computer system configurations. In some embodiments, portions of the techniques described herein (e.g., scaling-aware traffic request prioritization for a scalable connection-based resource) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computers comprising respective processors and memory configured to implement a first request priority manager for a scalable connection-based resource, the first request priority manager configured to:
receive request traffic for a scalable connection-based resource;
monitor a connection capacity or request processing capacity of the scalable connection-based resource;
in response to a determination that the scalable connection-based resource is at or within a threshold limit of a maximum capacity for the connection capacity or request processing capacity of the scalable connection-based resource, begin applying a first priority policy obtained from a policy data store to newly received request traffic for the scalable connection-based resource to determine a priority of some of the newly received requests over others; and
in response to a determination that the scalable connection-based resource is no longer at or within the threshold limit of the maximum capacity for the scalable connection-based resource, cease applying the first priority policy to newly received request traffic for the scalable connection-based resource.

2. The system of claim 1, wherein the first request priority manager comprises a connection pooler configured to:
establish respective front-end connections with a plurality of requesters for receiving the request traffic for the scalable connection-based resource; and
maintain a pool of backend connections to the scalable connection-based resource for sending the request traffic to the scalable connection-based resource;
wherein to apply the first priority policy the first request priority manager is requests received via the respective front-end connections are sent over the backend connections to the scalable connection-based resource.

3. The system of claim 2,
wherein, responsive to an increase in the request traffic for the scalable connection-based resource, the connection pooler is configured to request one or more additional backend connections to the scalable connection-based resource to increase a number of connections in the pool of backend connections,
wherein the determination that the scalable connection-based resource is at or within the threshold limit of the maximum capacity is based on the ability of the scalable connection-based resource to accept the one or more additional backend connections.

4. The system of claim 3,
wherein the scalable connection-based resource comprises a group of resources instances configured to establish the backend connections with the connection pooler and process requests from the request traffic received via respective connections of the backend connections, wherein the scalable connection-based resource is scalable to increase or decrease a number of resources instances in the group of resources instances; and
wherein the first request priority manager is configured to request the scalable connection-based resource to increase the number of resources instances in the group of resources instances in response to an indication that the scalable connection-based resource is unable to accept the one or more additional backend connections.

5. The system of claim 2, further comprising:
one or more computers comprising respective processors and memory configured to implement a second request priority manager, implemented at the scalable connection-based resource and configured to:
receive request traffic for the scalable connection-based resource over the backend connections;
monitor the connection capacity or request processing capacity of the scalable connection-based resource; and
in response to a determination that the scalable connection-based resource is at or within a threshold limit of a maximum capacity for the scalable connection-based resource, begin applying a second priority policy to newly received request traffic for the scalable connection-based resource to prioritize some requests over others, wherein the second priority policy is different from the first priority policy.

6. A method, performed by one or more processors of one or more computing devices, the method comprising:
receiving, by a first request priority manager, request traffic for a scalable connection-based resource;
monitoring a connection capacity or request processing capacity of the scalable connection-based resource;
applying, by the first request priority manager and in response to a determination that the scalable connection-based resource is at or within a threshold limit of a maximum capacity for the connection capacity or request processing capacity of the scalable connection-based resource, a first priority policy obtained from a policy data store to newly received request traffic for the scalable connection-based resource to determine a priority of some of the newly received requests over others; and
in response to determining that the scalable connection-based resource is no longer at or within the threshold limit of the maximum capacity for the scalable connection-based resource, cease applying the first priority policy to newly received request traffic for the scalable connection-based resource.

7. The method of claim 6, wherein the first request priority manager comprises a connection pooler configured to:
establishing, by a connection pooler of the first request priority manager, respective front-end connections with a plurality of requesters for receiving the request traffic for the scalable connection-based resource; and
maintaining, by the connection pooler, a pool of backend connections to the scalable connection-based resource for sending the request traffic to the scalable connection-based resource;
wherein said applying the first priority policy comprises determining, according to the first priority policy, which requests received via the respective front-end connections are sent over the backend connections to the scalable connection-based resource.

8. The method of claim 7, further comprising:
responsive to an increase in the request traffic for the scalable connection-based resource,
requesting by the connection pooler one or more additional backend connections to the scalable connection-based resource to increase a number of connections in the pool of backend connections, wherein said determining that the scalable connection-based resource is at or within the threshold limit of the maximum capacity is based on the ability of the scalable connection-based resource to accept the one or more additional backend connections.

9. The method of claim 8, wherein:
the connection pooler comprises a group of connection pool instances for maintaining respective connections of the pool of backend connections to the scalable connection-based resource;
said increase the number of connections in the pool of backend connections comprises increase a number of connection pool instances in the group of connection pool instances; and
the method further comprises:
begin applying, by the first request priority manager, the first priority policy to the request traffic responsive to reaching a maximum number of connection pool instances or a maximum number of connections in the pool of backend connections.

10. The method of claim 6, wherein:
the first priority policy specifies one or more data objects stores at the scalable connection-based resource; and
said applying the first priority policy comprises prioritizing requests that access at least one of the one or more data objects specified in the first priority policy.

11. The method of claim 6, wherein:
the first priority policy specifies one or more requestor identifiers (IDs); and
said applying the first priority policy comprises prioritizing respective requests that indicate one of the one or more requestor IDs specified in the first priority policy as a source of the respective request.

12. The method of claim 6, further comprising:
providing, by the first request priority manager, an interface for a user of the scalable connection-based resource to specify the first priority policy.

13. The method of claim 6, wherein:
the first request priority manager comprises an artificial intelligence component; and
the method further comprises specifying or modifying, by the artificial intelligence component, the first priority policy based on historical request traffic to the scalable connection-based resource.

14. One or more non-transitory computer-readable media storing program instructions executable on or across one or more processors implement a first request priority manager to:
monitor a connection capacity or request processing capacity of a scalable connection-based resource to which request traffic is directed;
begin application, in response to a determination that the scalable connection-based resource is at or within a threshold limit of a maximum capacity for the connection capacity or request processing capacity of the scalable connection-based resource, of a first priority policy obtained from a policy data store to newly received request traffic for the scalable connection-based resource to determine a priority of some of the newly received requests over others; and
cease application, in response to a determination that the scalable connection-based resource is no longer at or within the threshold limit of the maximum capacity for the scalable connection-based resource, of the first priority policy to newly received request traffic for the scalable connection-based resource.

15. The one or more non-transitory computer-readable media of claim 14, storing program instructions executable to implement a connection pooler at the first request priority manager, the connection pooler to:

establish respective front-end connections with a plurality of requesters for receiving the request traffic for the scalable connection-based resource; and maintain a pool of backend connections to the scalable connection-based resource for sending the request traffic to the scalable connection-based resource;

wherein said application of the first priority policy comprises determine, according to the first priority policy, which requests received via the respective front-end connections are sent over the backend connections to the scalable connection-based resource, and which requests received via the respective front-end connections are not sent over the backend connections to the scalable connection-based resource.

16. The one or more non-transitory computer-readable media of claim 15, storing program instructions executable to cause the connection pooler to:

responsive to an increase in the request traffic for the scalable connection-based resource, request one or more additional backend connections to the scalable connection-based resource to increase a number of connections in the pool of backend connections; and base the determination that the scalable connection-based resource is at or within the threshold limit of the maximum capacity on the ability of the scalable connection-based resource to accept the one or more additional backend connections.

17. The one or more non-transitory computer-readable media of claim 15, wherein:

the connection pooler comprises a group of connection pool instances for maintaining respective connections of the pool of backend connections to the scalable connection-based resource;

to increase the number of connections in the pool of backend connections, the program instructions are executable to increase a number of connection pool instances in a group of connection pool instances; and the program instructions are executable to perform said application, by the first request priority manager, of the first priority policy to the request traffic responsive to reaching a maximum number of connection pool instances or a maximum number of connections in the pool of backend connections.

18. The one or more non-transitory computer-readable media of claim 15, wherein:

the first priority policy specifies one or more data objects stores at the scalable connection-based resource; and to perform said application of the first priority policy the program instructions are executable to prioritize requests that access at least one of the one or more data objects specified in the first priority policy.

19. The one or more non-transitory computer-readable media of claim 15, wherein:

the first priority policy specifies one or more requestor identifiers (IDs); and to perform said application of the first priority policy the program instructions are executable to prioritize respective requests that indicate one of the one or more requestor IDs specified in the first priority policy as a source of the respective request.

20. The one or more non-transitory computer-readable media of claim 15, wherein the program instructions are executable to cause the first request priority manager to determine an anomalous pattern in the request traffic and modify the first priority policy to change a prioritization for new request traffic corresponding to the determined anomalous pattern.

* * * * *